(12) United States Patent
Corderman et al.

(10) Patent No.: US 6,615,470 B2
(45) Date of Patent: Sep. 9, 2003

(54) SYSTEM AND METHOD FOR REPAIRING CAST ARTICLES

(75) Inventors: Reed Roeder Corderman, Niskayuna, NY (US); Shyh-Chin Huang, Latham, NY (US); Thomas Robert Raber, Schenectady, NY (US); Don Mark Lipkin, Niskayuna, NY (US); Raymond Alan White, Schenectady, NY (US); Sidney Perham Young, Scotia, NY (US); Melvin Robert Jackson, Niskayuna, NY (US); Peter William Schilke, Scotia, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/725,738

(22) Filed: Nov. 29, 2000

(65) Prior Publication Data
US 2003/0150092 A1 Aug. 14, 2003

Related U.S. Application Data

(63) Continuation of application No. 08/990,607, filed on Dec. 15, 1997, now abandoned.

(51) Int. Cl.⁷ .................................................. B23P 6/00
(52) U.S. Cl. ............................... 29/402.13; 29/402.11; 29/402.16; 29/889.1
(58) Field of Search ........................ 29/402.11, 402.13, 29/402.16, 402.18, 889.1, 889.7, 526.4

(56) References Cited

U.S. PATENT DOCUMENTS

| | | | | |
|---|---|---|---|---|
| 3,487,530 A | * | 1/1970 | Ely .............................. 228/119 |
| 3,609,287 A | * | 9/1971 | Hinrichs et al. ....... 219/121.14 |
| 3,761,201 A | * | 9/1973 | Silverstein et al. ......... 416/232 |
| 3,806,693 A | * | 4/1974 | Miller .................... 219/121.13 |
| 4,068,111 A | * | 1/1978 | Klumpes .................. 219/73.11 |
| 4,127,762 A | * | 11/1978 | Paton et al. ............ 219/121.34 |
| 4,160,150 A | * | 7/1979 | Konig ................... 219/121 EB |
| 4,357,517 A | * | 11/1982 | De Sivry et al. ......... 219/121.2 |
| 4,592,268 A | * | 6/1986 | Hartsock ...................... 92/212 |
| 5,111,570 A | * | 5/1992 | Baumgarten et al. ..... 29/402.13 |
| 5,185,924 A | * | 2/1993 | Fraser ........................ 29/889.1 |
| 5,272,809 A | * | 12/1993 | Robertson et al. ......... 29/889.1 |
| 5,479,704 A | * | 1/1996 | Richter et al. ............. 29/889.7 |
| 5,806,751 A | * | 9/1998 | Schaefer et al. ............. 228/119 |
| 6,115,917 A | * | 9/2000 | Nolan et al. ............... 29/889.1 |
| 6,128,820 A | * | 10/2000 | Nolan et al. ............... 29/889.1 |

(List continued on next page.)

FOREIGN PATENT DOCUMENTS

| | | | | |
|---|---|---|---|---|
| EP | 0740976 | * | 11/1996 | ............. B23P/6/00 |
| GB | 2114921 | * | 9/1983 | .............. 29/402.13 |
| GB | 2271521 | * | 4/1994 | .............. 29/402.13 |

OTHER PUBLICATIONS

J. P. Blakely, Electron Beam Welding: some questions answered, Welding Journal Institute, May 1983.*

Primary Examiner—Gregory Vidovich
Assistant Examiner—Essama Omgba
(74) Attorney, Agent, or Firm—Robert P. Santandrea; Patrick K. Patnode

(57) ABSTRACT

A system and method for repairing defects such as bumper holes, cracks, freckles and inclusions, in a cast article, such as a turbine component. The system comprises a device for locating a defect in a cast article, a repair material that is disposable at a defect site, at least one heat source capable of heating the repair material and a portion of the cast article to a molten state. The method of using the system comprises locating a defect in the cast article, providing a repair material to the defect site, melting the repair material and cast article at the defect site, and cooling the molten repair material and portion of the casting article such that they resolidify and fuse together. The method may further comprise removing a portion of the cast article at the defect site, removal of excess repair material and inspecting the cast article following repair of the defect.

34 Claims, 12 Drawing Sheets

U.S. PATENT DOCUMENTS

| | | | | |
|---|---|---|---|---|
| 6,145,194 A | * | 11/2000 | Munson et al. | 29/889.1 |
| 6,148,517 A | * | 11/2000 | Johnson et al. | 29/889.1 |
| 6,154,959 A | * | 12/2000 | Goodwater et al. | 29/889.1 |
| 6,158,955 A | * | 12/2000 | Caddell, Jr. et al. | 415/115 |
| 6,172,327 B1 | * | 1/2001 | Aleshin et al. | 219/121.64 |
| 6,331,361 B1 | * | 12/2001 | Esch et al. | 428/548 |
| 6,332,272 B1 | * | 12/2001 | Sinnott et al. | 29/889.1 |
| 6,339,878 B1 | * | 1/2002 | Owen et al. | 29/889.1 |
| 6,370,752 B1 | * | 4/2002 | Anderson et al. | 29/402.11 |
| 6,385,836 B1 | * | 5/2002 | Coltrin | 29/402.18 |
| 6,426,152 B1 | * | 7/2002 | Johnson et al. | 428/553 |
| 6,454,156 B1 | * | 9/2002 | Taras, Jr. et al. | 228/165 |
| 6,464,128 B1 | * | 10/2002 | Messelling et al. | 228/119 |
| 6,470,568 B2 | * | 10/2002 | Fried et al. | 29/889.1 |
| 6,490,791 B1 | * | 12/2002 | Surace et al. | 29/889.1 |
| 6,508,000 B2 | * | 1/2003 | Burke et al. | 29/889.1 |

* cited by examiner

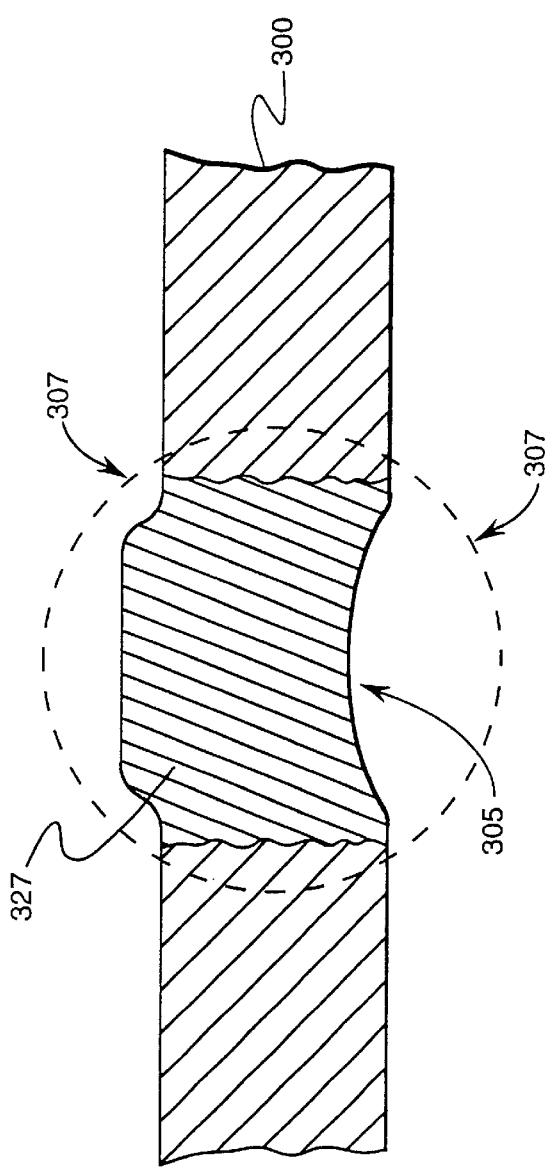
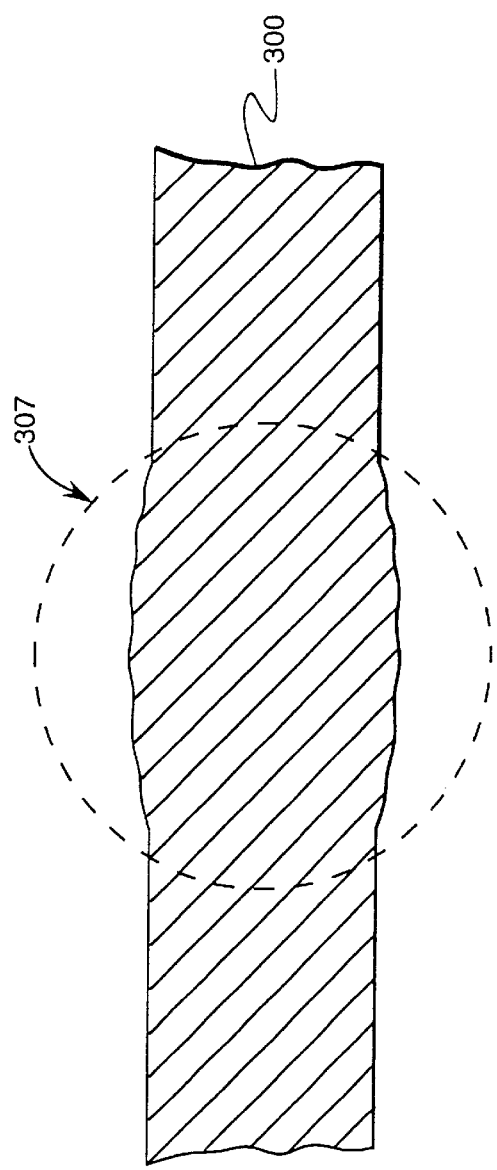

SYSTEM AND METHOD FOR REPAIRING CAST ARTICLES

CROSS REFERENCE TO RELATED APPLICATIONS

This application is a Continuation of Application Ser. No. 08/990,607, filed on Dec. 15, 1997, now abandoned.

BACKGROUND OF THE INVENTION

Modern gas turbine engines and their respective components, operate at high rotational speeds and high temperatures for increased performance and efficiency. Thus, the materials from which these components are made must be able to withstand severe operating environments.

Most high temperature gas turbine components are made of nickel base superalloys, which are alloys that are specifically developed for applications involving extreme temperatures and mechanical stresses. Superalloys are often cast, by an appropriate process, into the component shape. For example, directional solidification is known in the art. This casting technique aligns grain boundaries parallel to the stress axis. This alignment enhances elevated temperature strength by increasing resistance to creep and minimizing grain boundary failure initiation sites.

An extension of the above-described technique is single crystal casting. Casting of alloys in single crystal form eliminates internal crystal boundaries in the finished article. Single crystal turbine blades and vanes possess superior characteristics, such as strength, ductility and crack resistance at high operating temperatures. Thus, single crystal articles are extensively used in components of gas turbine engines.

Although single crystal engine components are desirable, they are extremely costly to manufacture. Defects often occur during manufacturing, as well as after extensive engine operation. Upon detection of certain critical defects, such as cracks, the component must be repaired, replaced or otherwise scrapped. This incurs a significant expense and is undesirable.

The fabrication of gas turbine components, for example blades or nozzles, can occur by various processes, such as by investment casting. In investment casting of relatively complex airfoil parts, intentional defects, such as "bumper holes," may be required for casting the part, as is known in the art. The bumper holes constitute an "intentional" defect used to hold the casting core during casting of relatively complex articles.

Ceramic bumpers are added to the ceramic core to limit the maximum distortion or motion of the core relative to the mold, to achieve a control of wall thickness in a cavity. The bumper holds the casting core in place during casting. After the core is removed, a thin spot remains where a bumper was located. This thin region is removed forming a "bumper hole" that can then be repaired to achieve the full required wall thickness.

The bumper holes should be repaired when the casting is completed and prevent coolant leakage and to make the casting usable. Accordingly, post-processing of the investment casting is needed to remove the bumper holes.

Several proposed repair methods for cracks in components have been proposed. For example, European patent application EP 0740976 (EP 976) discloses a method of repairing single crystal metallic articles using a laser technique. EP 976 attempts to overcome problems associated with the laser weld repair of these articles by optimizing laser parameters. In particular, EP 976 provides a molten material at the crack, solidifies the molten material, and provides a re-melt of a once solidified melt from a second energy source, in an attempt to provide an acceptable stress-free repair. However, EP 976 does not discuss a repair of as-cast articles. Further, EP 976 does not provide for removal of defects, and does not provide for melting of the casting to insure a sound metallurgical bond and physical repair. Furthermore, the second application of energy in EP 976 is costly and inefficient with respect to both in time and power consumption.

It is desirable to reduce overall costs involved with casting. This cost reduction includes avoiding scrapping newly cast articles with manufacturing defects. This cost reduction also includes efficiently repairing, rather than scrapping and re-casting, parts with defects resulting from use of the part.

SUMMARY DESCRIPTION OF THE INVENTION

Accordingly, it is desirable to provide a method for repairing defects in airfoils that reduces costs associated with the production of airfoils.

Further it is desirable to provide a method for repairing defects in airfoil components and parts, which are produced by investment casting processes, that reduces costs associated with the production of said airfoil components.

It is also desirable to provide a process with means to repair defects, both intentional, such as "bumper hole" defects, or unintentional, such as freckles and inclusions from the casting process or cracks resulting from use, thereby minimizing the need to scrap and recast. A reduction in process costs results in a savings to the manufacturer, and ultimately to the customer.

Therefore, it is desirable to provide a method of repairing defects in cast articles, where the defect comprises at least one of a manufacturing, intentional, or service-induced defect. The cast article comprises a casting core and a casting, the casting core comprising a ceramic bumper that creates a thin region in the casting comprising the defect. The method of repairing the defect comprises locating a defect at a defect area in the cast article; removing an area of the casting at the defect area; removing an area of the casting core including the bumper at the defect area where removing the area of the casting at the defect area and removing an area of the casting core including the bumper at the defect area creates a hole through a wall of the casting; positioning repair material in the hole; heating the defect area so the repair material and the area of the defect become molten; and resolidifying the molten material to form a repaired casting.

Also, it is desirable to provide a method, similar to that above, but without forming the hole, to repair surface defects, such as voids, freckles and inclusions.

Further, it is desirable to provide a repaired article formed by the methods, as embodied by the invention.

These and other aspects, advantages and salient features of the invention will become apparent from the following detailed description, which, when taken in conjunction with the annexed drawings, disclose embodiments of the invention.

BRIEF DESCRIPTION OF THE DRAWINGS

While the novel features of this invention are set forth in the following description, the invention will now be described from the following detailed description of the invention taken in conjunction with the drawings, in which:

FIG. 22 is a side-sectional view of the repair filler material becoming molten material;

FIG. 23 is a side-sectional view of molten repair filler material and casting.

DETAILED DESCRIPTION OF THE INVENTION

Defects resulting from casting processes can take several distinct forms. For example, defects resulting from casting processes may include surface defects. Surface defects resulting from casting processes can include cracks, freckles, or voids which may result during re-solidification of the casting. Also, as described above, intentional defects, such as bumper holes, constitute defects.

Defects may also result from use of the cast component. For example, these defects can be cracks resulting from field use of the component. These cracks are due, at least in part to a critical combination of thermal and mechanical stresses that the components are subjected to during operation.

Cracks that result from field use often require cleaning, because the crack surfaces may have been oxidized. Oxidized crack surfaces present an undesirable surface for repair. The oxidized surface is unreliable both mechanically and metallurgically. A mechanically and metallurgically sound repair by bonding a metal in an oxidized crack will be difficult, if not impossible, due to oxides on the crack surface.

Accordingly, as embodied by the invention, it is desirable and advantageous to provide a method for repair of defects in castings, where the defects result from at least one of casting processes and use. By virtue of the repair process, as embodied by the invention, the casting will be reliably repaired, without the need for the casting to be scrapped. Therefore, as embodied by the invention, methods for repairing defects in cast products provide extended use of casting and avoid scrapping the casting.

As embodied by the invention, the repair of defects in cast products comprises a method that includes heat treating the defect area, the repair material and the casting itself, with or without repair material. The heat treating is done by an appropriate device and method, for example by at least one of electron beam welding, plate welding and other welding processes.

Figure 1:
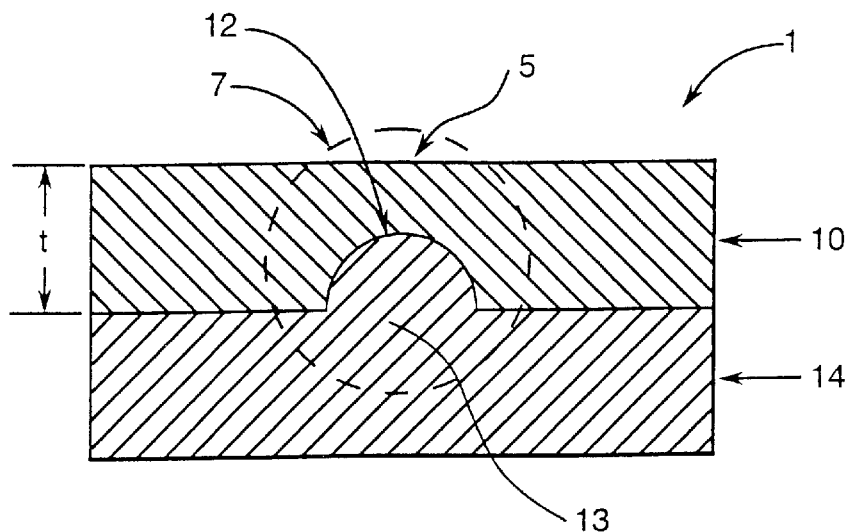
FIG. 1 is a side-sectional view of an intentional defect, for example, a thin region in a casting, for example resulting from a ceramic bumper.
Figure 2:
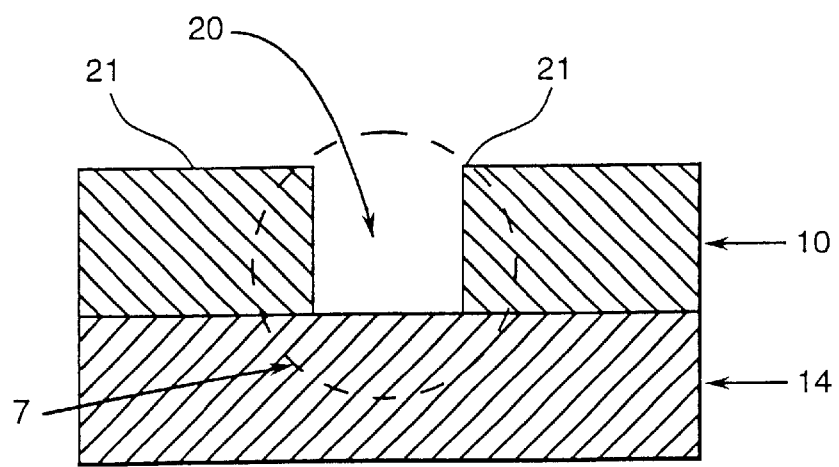
FIG. 2 is a side-sectional view of a "bumper hole" made to remove the cast product and thin region in a process, as embodied by the invention.
Figure 3:
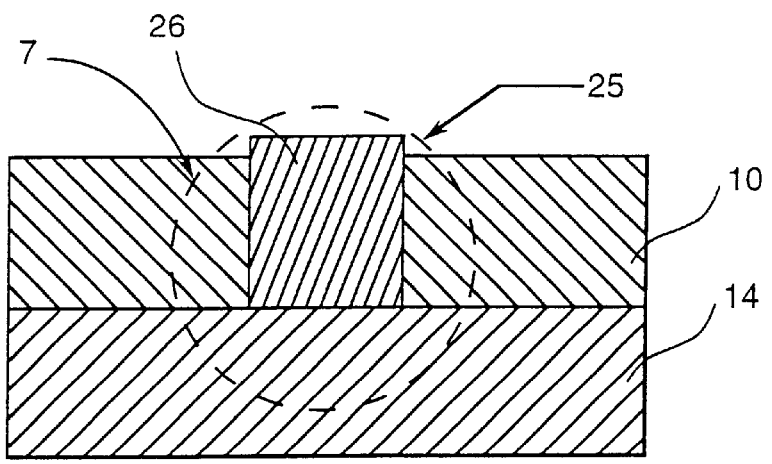
FIG. 3 is a side-sectional view of a repair filler material in the bumper hole of FIG. 2.
Figure 4:
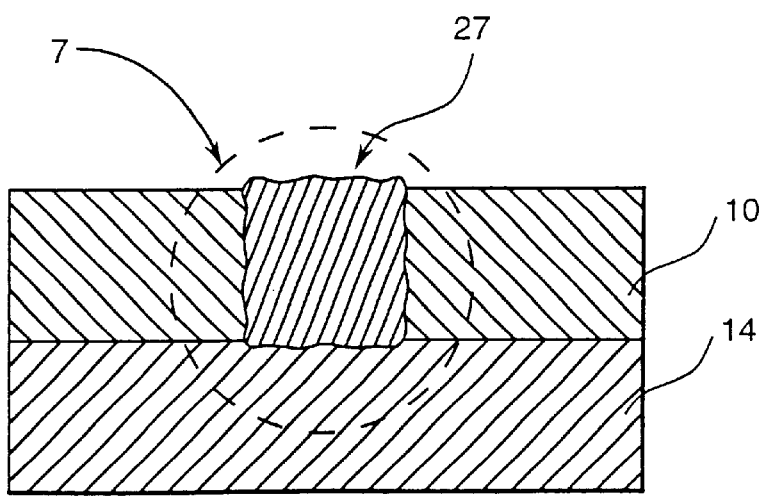
FIG. 4 is a side-sectional view of molten repair filler material and cast material.
Figure 5:
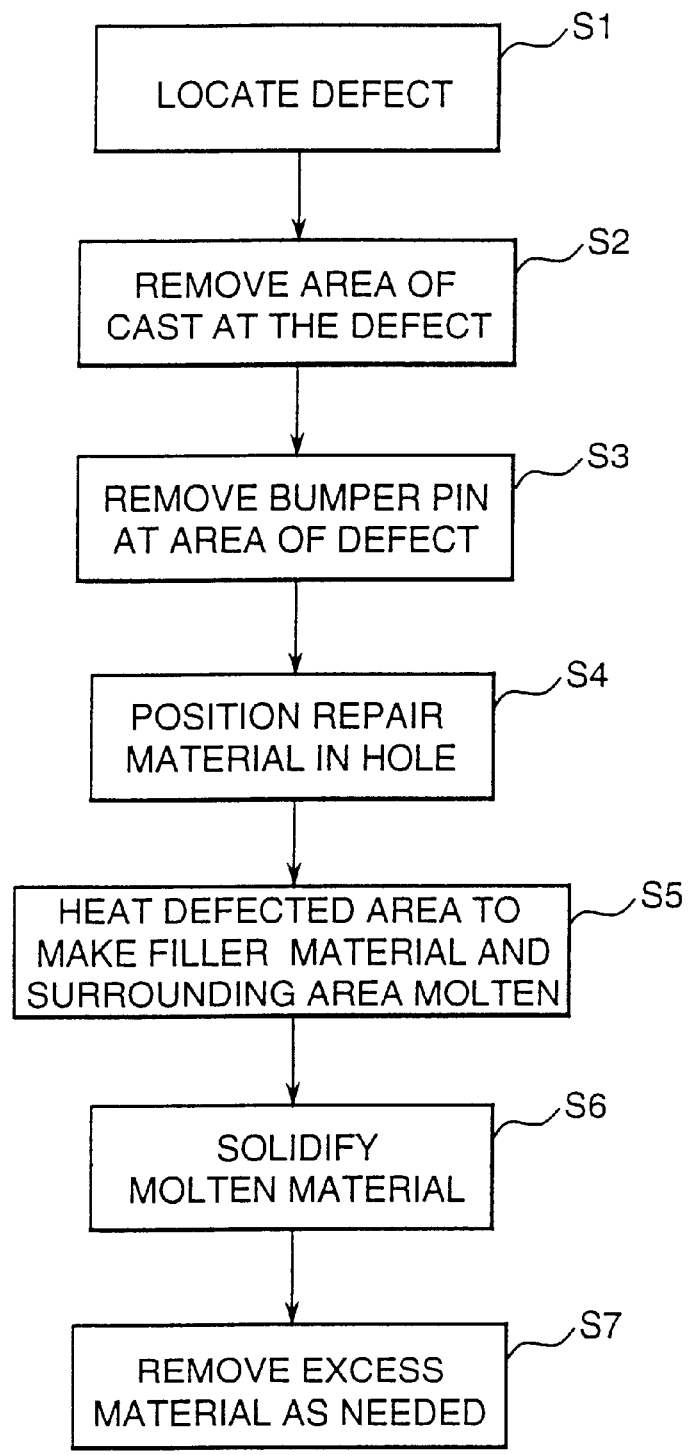
FIG. 5 is a flow chart of a process for repairing intentional defects, for example a bumper hole, as embodied by the invention.

A repair method, as embodied by the invention, for the repair of a defect, such as bumper holes, will now be discussed with reference to FIGS. 1–4 and the flowchart of FIG. 5. The casting process is, for example but not limited to, an investment casting process. The cast article 1 relies upon at least one bumper 13 for casting due to the complexity of the casting 10. Because investment casting is known in the art, an explanation of the process is omitted. Thus, the cast article 1 comprises a ceramic casting core 14 used in a casting process and a casting 10.

If the casting process uses at least one bumper 13, the repair method for bumper recess or hole defects comprises first locating the defect 5, in step S1. Location of the defects 5 is done prior to any removal, separation, or reduction of the ceramic casting core 14. The ceramic core 14 provides a support for filler material 25, which will be used to repair the defect 5, as described hereafter.

Once the defect 5 has been located, a part of a defect area 7 (dashed line in the Figures) of the cast article 1 that surrounds the bumper hole 12 is removed, in step S2. Next, a ceramic bumper 13, which is used in the investment casting process to form the bumper hole 12 is removed, in step S3. Preferably, the removal of the ceramic bumper 13 is in the same step that removes the casting 10 at the defect area 7. Accordingly, the removal of material forms a flat-bottomed hole 20 generally located at the defect area 7.

A repair material 25, alternately referred to as a filler material, is then provided in the flat-bottomed hole 20, in step S4. The repair material 25 is preferably the same material of the casting 10. Alternatively, the repair material 25 may be a material that is compatible, metallurgically and physically, with the casting 10.

The repair material 25 is provided generally in the form of a repair material plug 26. The repair material plug 26 preferably has a general shape approximately conforming to the shape of the flat-bottomed hole 20. This conforming shape permits the repair material to substantially fill the entire flat-bottomed hole 20. Alternatively, the repair material plug 26 need not approximate the shape of the flat-bottomed hole 20, provided the volume of the repair material plug 26 is greater that the volume of the hole 20.

The volume of the repair material plug 26 should be sufficient to completely fill the flat-bottomed hole 20, and extend above the hole 20 top surface 21. In other words, the volume of the filler material 25 is greater than the volume of the flat-bottomed hole 20. This extension of the repair material plug 26 above the hole surface 21 will assure that the repair material plug 26 will completely fill the hole 20 upon melting. Further, as embodied by the invention, cooling stresses that may form during the cooling of the molten material will tend to be distributed in any excess material above the top surface 21 of the flat-bottomed hole 20. In other words, stresses are formed away from the casting 10.

Once the repair material plug 26 has been inserted into the flat-bottomed hole 20, the defect area 7 is heat treated, with full penetration of the casting thickness t, in step S5. For example, the defect area 7 can be heated by an appropriate heating device, such as but not limited to, an electron beam welder. The heat in step S5 is applied under predetermined conditions to bring at least a portion of surrounding material of the casting 10 and the repair material plug 26 into a molten condition 27 in FIG. 4.

The heating preferably comprises a gradual heating of the casting 10 and the repair material plug 26. The predetermined conditions also provide a gradual cooling of the molten material 27. The gradual heating and gradual cooling minimizes temperature gradients formed during repair. Gradual heating and cooling minimizes temperature gradients formed during repair, thus minimizing stress generation in the defect area 7.

The predetermined conditions for heating are dependent upon several factors. These factors, include, but are not necessarily limited to: the material composition of the casting 10; the repair material 25 composition; the location of the defect area 7; the ambient environment of the cast article 1, for example vacuum or a partial pressure of inert gaseous environment.

With the surrounding material of the casting 10 and the repair material plug 26 as molten material 27, the retained ceramic core 14 supports the molten material 27 until it re-solidifies, at step S6. Therefore, the molten material 27 is kept at the defect area 7.

Any excess material can be removed further in the repair process, step S7, if needed. The excess material remaining on the repaired casting surface can be removed by, for example, at least one of a machining process and a benching process. The core is then removed, by known methods, resulting in a repaired casting.

After the molten material at 27 has re-solidified in step S6 and any excess material is removed, as needed in step S7, the repaired casting is inspected at the defect area 7 by an appropriate inspection device. The inspection device determines whether the repair process has successfully repaired the defect 5. If the inspection determines that the repair process has successfully repaired the defect, the manufacturing process continues.

The cast article 1, as embodied by the invention, can be in any form, such as one of an as-cast condition and a casting after a first solution heat treatment after initial casting.

A casting 10 is often prone to cracking during any type of localized heating operations, such as in previously attempted repair processes. To eliminate cracking, as embodied by the invention, a slow, uniform heating and cooling, reduces thermal stresses in the molten material 27.

Heating, for example by electron beam welding, as embodied by the invention, provides a slow, uniform heating and cooling to reduce thermal stresses induced to the re-solidified material. Further predetermined parameters for heating by electron beam welding, comprise but are not limited to: 1) electron beam focus factors, such as a suitable raster pattern, for example area, line or spot patterns, a suitable amount of beam dither, and other electron beam focus variables; 2) at least partial, and alternatively, full, weld penetration, controlled by electron beam potential; 3) an appropriate casting material, such as but not limited to, a nickel base superalloy, which provides concomitant heating, holding, and cooling ramp rates; and 4) an appropriate pre-heat temperature for the cast article 1.

If the casting 10 comprises directionally solidified and single crystal structures, the above-described repair process creates grain structure in the repaired area 7 that is substantially similar to, and very compatible with, the initial microstructure of the casting 10. This is especially advantageous, as it provides a structurally and metallurgically sound and reliable repair.

Inspection of the repaired part comprises any appropriate inspection device, such as but not limited to, an ultrasonic inspection device, a bright field illumination device, a fluorescent dye penetration inspection device, an x-ray inspection device and combinations of such devices.

Figure 6:
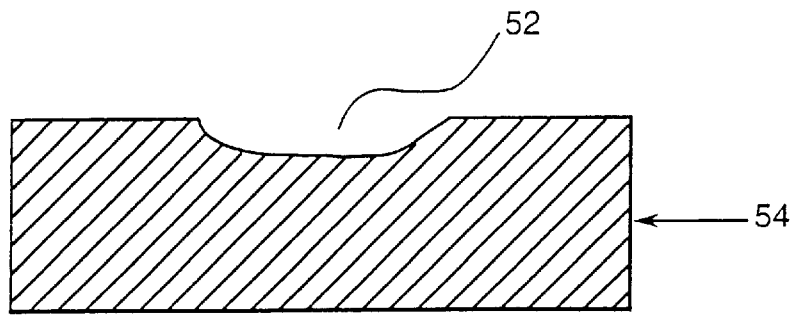
FIG. 6 is a side-sectional view of a surface defect in a casting.
Figure 7:
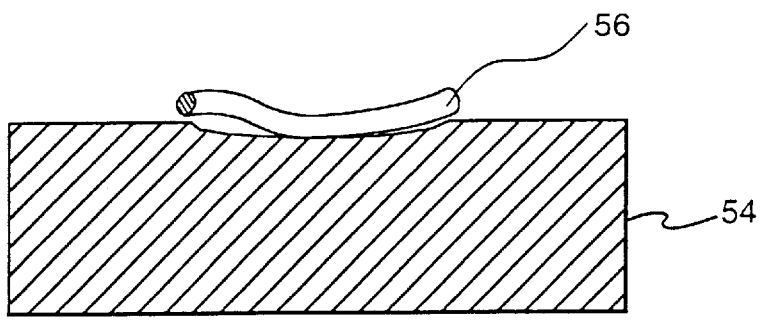
FIG. 7 is a side-sectional view of a surface defect repair filler material in the surface defect of FIG. 6.
Figure 8:
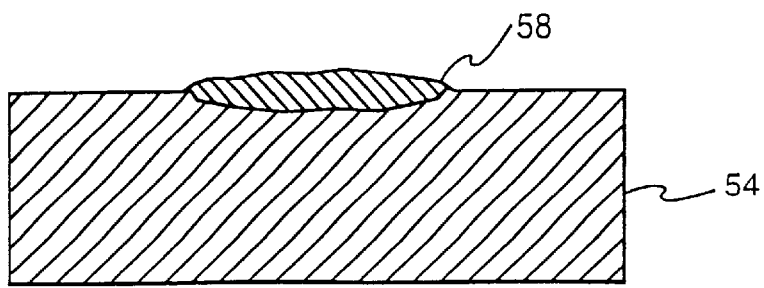
FIG. 8 is a side-sectional view of a molten surface defect repair filler material and cast material.
Figure 9:
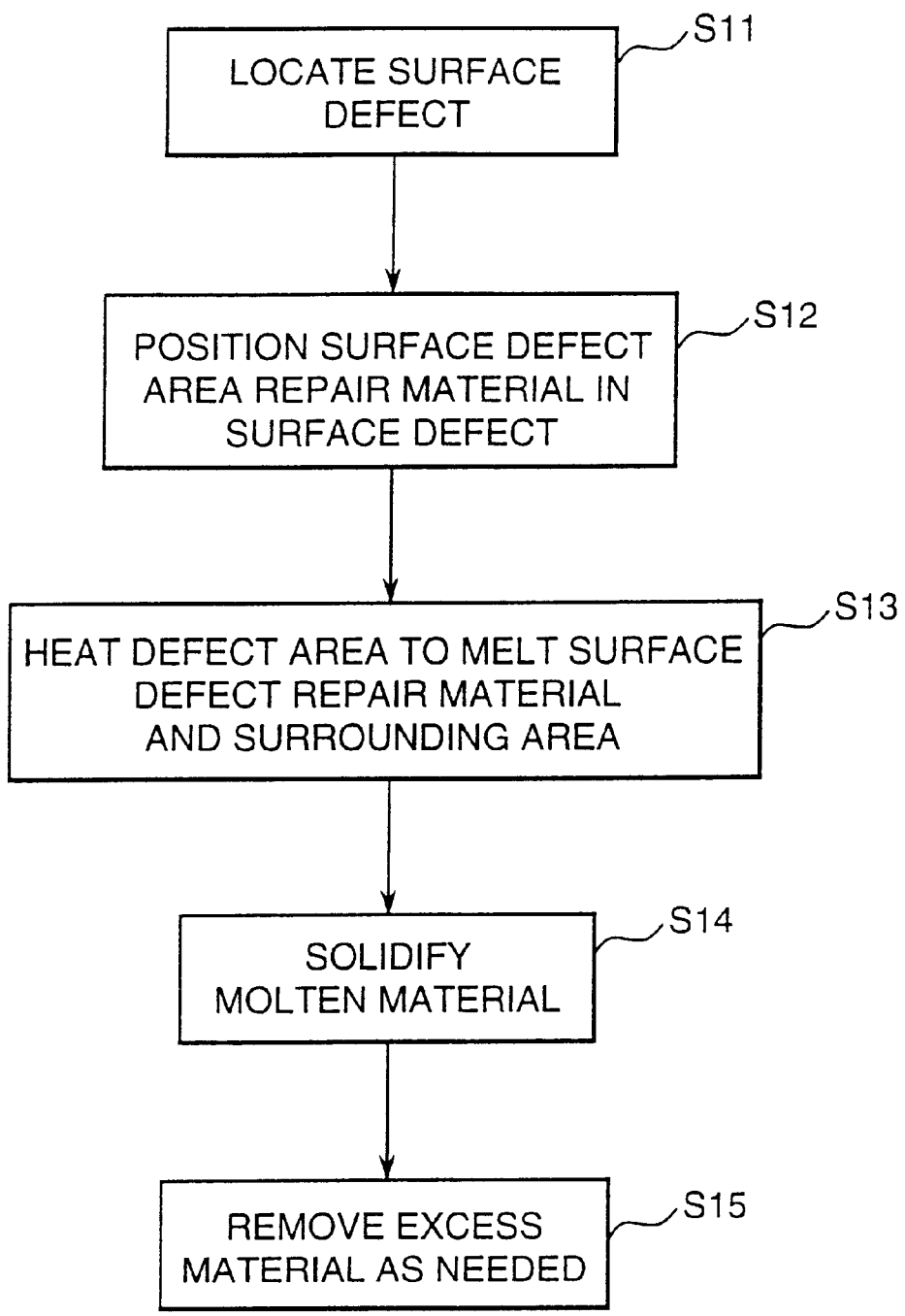
FIG. 9 is a flow chart of a process for repairing surface defects, as embodied by the invention.
Figure 10:
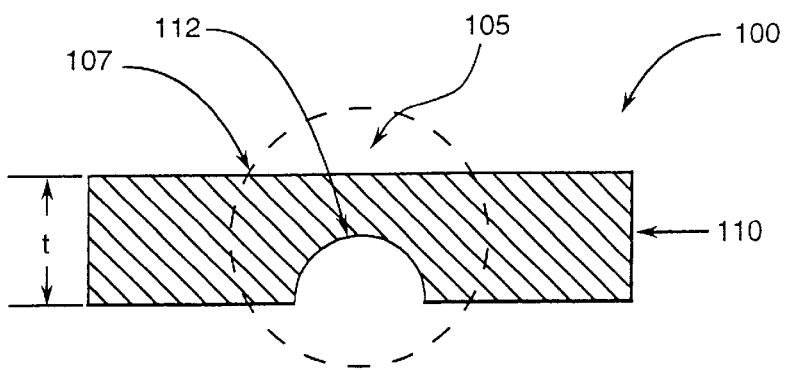
FIG. 10 is a side-sectional view of a casting formed using an intentional defect, for example, a bumper hole, with the casting core removed.
Figure 11:
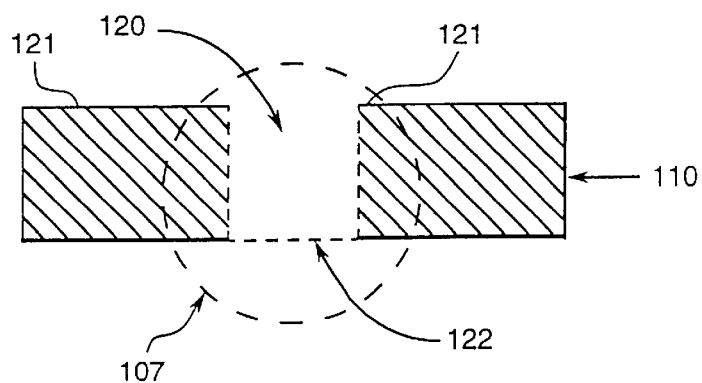
FIG. 11 is a side-sectional view of a hole in the casting, as embodied by the invention.
Figure 12:
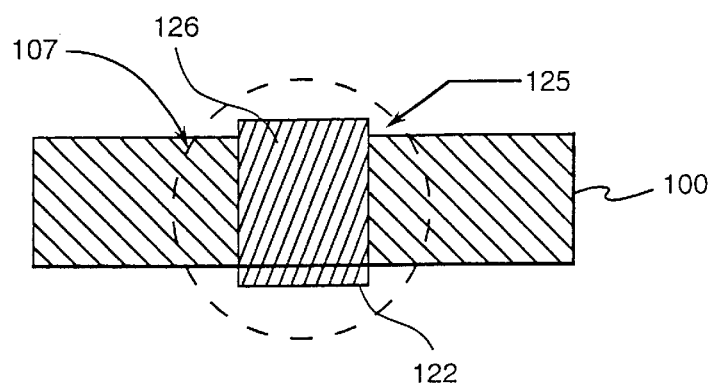
FIG. 12 is a side-sectional view of a repair filler material in the hole of FIG. 11.

The above described method discusses a repair of bumper holes and other through-wall defects in an investment casting. A process for surface defect repair, including but not limited to voids, surface freckles, inclusions, cracks and freckles, as embodied by the invention, will now be discussed with reference to FIGS. 6–8 and the flowchart of FIG. 9.

The repair of surface defects comprises initially locating the defect 52, in step S11. Once the defect 52 has been located in the casting 54, a defect repair material 56 may be provided to the defect 52, in step S12.

The surface defect repair material 56, if needed, is preferably in the form of a filler wire, elongated strand-like material or other compatibly shaped surface defect repair material. The surface defect repair material 56 is preferably formed of a composition that is the same as the composition of the casting 54. Alternatively, as discussed above, the surface defect repair material may be formed of a composition that is compatible with, both metallurgically and physically, with the material of the casting 54.

The surface defect repair material 56 is provided in a form of a filler wire, elongated strand-like material, or other compatible shape to approximate the shape of the defect 52. The surface defect repair material 56 conforms to and substantially fills the volume of the surface defect 52, while having a volume exceeding that of the defect 52. Alternatively, the surface defect repair material 56 may not have a shape approximating the shape of surface defect 52, as long as it has a volume greater than the volume of the surface defect. The surface defect repair material 56 can be provided as a cut piece of filler wire, an elongated strand-like material, or as a continuous feed wire, constituting a continuous feed wire repair process for surface defects. Alternatively, no additional repair material may be used.

To repair a surface defect 52, the repair material 56 is inserted into the defect 52, at step S12. Next, the defect area is heated at step S13 by heat treating with an appropriate heating device. As discussed above, the appropriate heating device may comprise, but is not limited to, an electron beam welder. The heat is applied under predetermined heating conditions, as discussed above.

After the surface defect repair material 56 and the surrounding casting 54 are molten 58, the molten material 58 is allowed to re-solidify in step S14. Any excess material is removed as needed, in step S15. Thereafter, the repaired casting 54 is inspected by an appropriate inspection device, as discussed above.

As embodied by the invention, repair of surface defects, such as freckles and cracks, may not require additional material to fill the defect. The defect may be comprised of a superficial irregularity in the microstructure of the casting, and not necessarily by a lack of material at the defect site. In this case, the surface defect to be repaired, such as a surface freckle is first located. The area of the surface defect is heated to make the surface defect area molten. The molten material is then re-solidified, as described above. Accordingly, a repaired surface defect, that was in the form of a surface freckle, is repaired as embodied by the invention.

A method for the repair of oxide-laden defects in castings, as embodied by the invention, such as but not limited to oxide-laden cracks, will now be discussed. The steps of the process for the repair of oxide-laden defects are substantially similar to the process of repairing surface defects, discussed above.

To repair oxide-laden defects, the defect is first located. The repair material is positioned over the oxide-laden defect, and the defect area is heated to cause the repair material and the surrounding cast material to become molten, as described above.

While molten, oxides are released from the surface of the defect. These oxides rise to the top of the molten material due to their relatively low density. With the oxides removed from the surface of the oxide-laden defect, a sound metallurgical bond and physically strong repair of the defect is achieved. Further details in the repair of oxide-laden defects, as embodied by the invention, are as discussed above, and further discussion is thus omitted.

Figure 13:
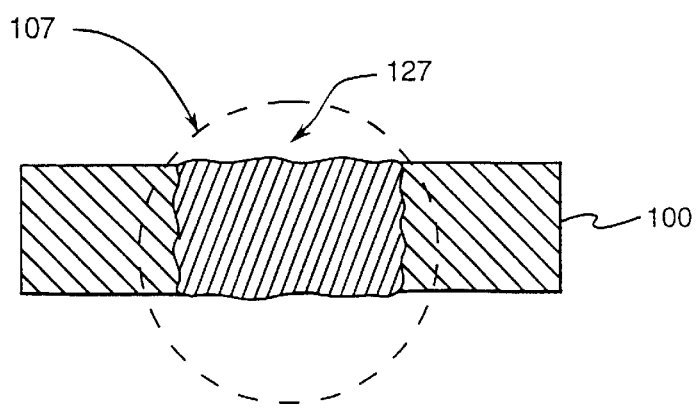
FIG. 13 is a side-sectional view of molten repair filler material and casting.
Figure 14:
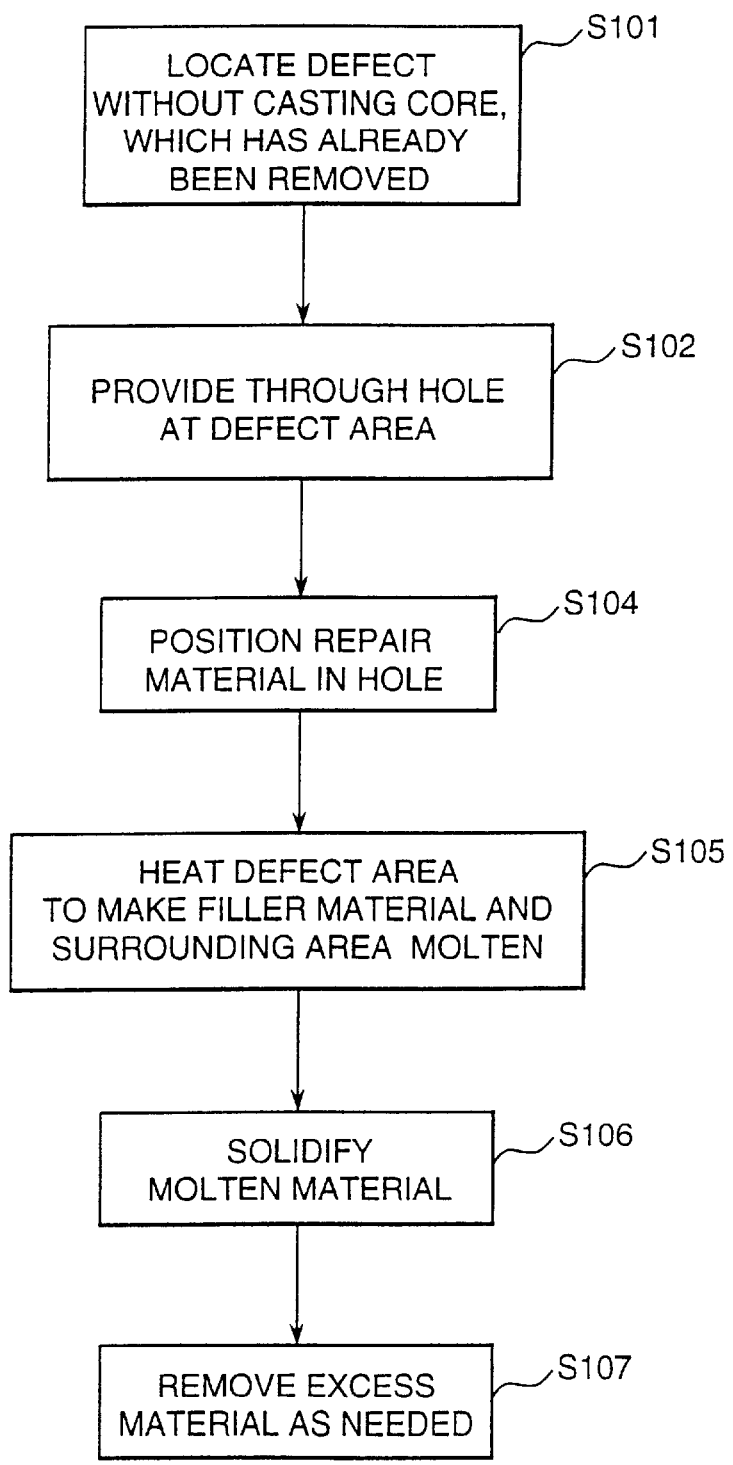
FIG. 14 is a flow chart of a process for repairing a casting having an intentional defect, such as a bumper hole, as embodied by the invention.
Figure 15:
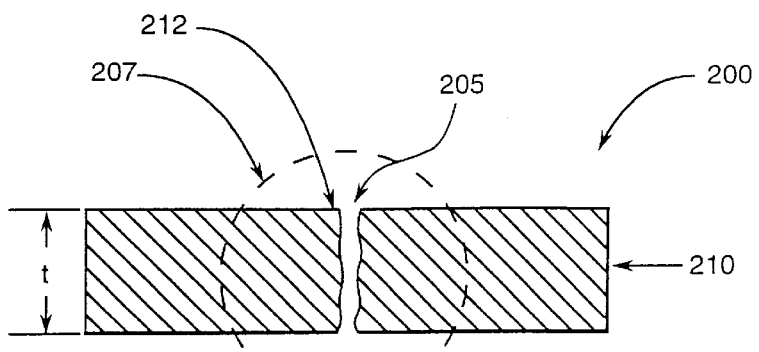
FIG. 15 is a side-sectional view of a defect, for example, a through crack in a casting.
Figure 16:
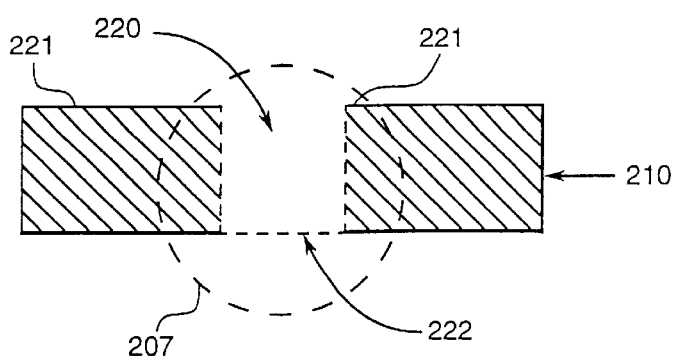
FIG. 16 is a side-sectional view of a hole in the casting, as embodied by the invention.
Figure 17:
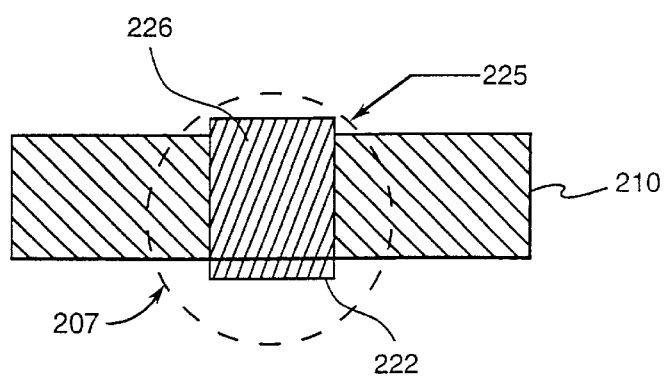
FIG. 17 is a side-sectional view of a repair filler material in the hole of FIG. 16.
Figure 18:
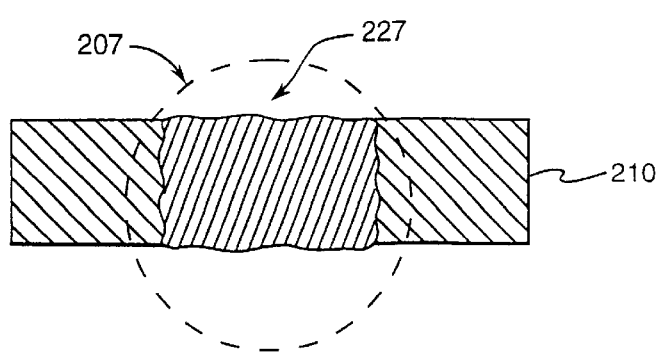
FIG. 18 is a side-sectional view of molten repair filler material and casting.

A repair method, as embodied by the invention, for the repair of a defect, such as bumper holes, will now be discussed with reference to FIGS. 10–13 and the flowchart of FIG. 14. The casting process is, for example but not limited to, an investment casting process. The casting 100 relies upon bumpers, as described above, due to the complexity of the casting 100. Because investment casting is known in the art, a detailed explanation of the process is omitted.

In this repair method, as embodied by the invention, the casting core and bumpers are removed prior to any steps of the repair. The casting core can be removed by any known methods relied upon in the art. Accordingly, the casting 100 comprises at least one bumper hole 112 and forms the article to be repaired.

The repair method for a casting 100 with a bumper hole 112 comprises first locating the defect 105, in step S100. The location of the defect 105 is done after removal, separation, or reduction of the ceramic casting core.

Once the defect 105 has been located, a part of a defect area 107 (dashed line in the Figures) of the cast article 100 that surrounds the bumper hole 112 is removed, in step S102. Accordingly, the removal of material forms a through-hole 120 generally located at the defect area 107.

A repair material 125, alternately referred to as a filler material, is then provided in the through-hole 120, in step S104. The repair material 125 is preferably the same material as the casting 100. Alternatively, the repair material 125 may be a material that is compatible, metallurgically and physically, with the casting 100.

The repair material 125 is provided generally in the form of a plug 126. The plug 126 preferably has a shape approximately conforming to the through-hole 120, permiting the repair material to substantially fill the entire hole volume 120. However, the plug 126 need not approximate the shape of the through-hole 120, as long as the volume of the plug 126 exceeds the volume of the hole 120.

The volume of the repair plug 126 should be sufficient to completely fill the through-hole 120 and extend above and below the hole 120 top 121 and bottom 122 surfaces. In other words, the volume of the filler material 125 is greater than the volume of the through-hole 120. This extension of the repair plug 126 above the through-hole 120 top surface 121 and bottom surface 122 will assure that the plug 126 will completely fill the through-hole 120 when melted. Any residual stresses that may be formed in the process are believed to be concentrated in the last portion of the molten material to re-solidify, for example in the areas outside of the through-hole 120 above the top surface 121 and below the bottom surface 122. Thus, any residual stresses that may cause cracks or other such defects can be removed by further machining of the repaired area.

Once the repair material plug 126 has been inserted into the through-hole 120, the defect area 107 is heat treated in step S105. However, contrary to the full-penetration heating described above, the beam does not fully penetrate the casting thickness, t. This partial-penetration heat treating, for example with an electron beam, prevents the electron beam from harming any material located behind the casting 100. The heat in step S105 is applied under predetermined conditions to bring at least a portion of surrounding material of the casting 100 and the repair material plug 126 into a molten condition 127, as shown in FIG. 13.

With the surrounding material of the casting 100 and the repair material plug 126 heated to molten material 127, the molten material is retained in the through-hole 120 by surface tension of the molten material. The principles of surface tension are well known, and a further discussion of surface tension is omitted.

The surface tension suspends the molten material 127 in the through-hole 120 within the support of the casting 100. The electron beam used for heating in step S105 is balanced to achieve melting of the plug 126 and the surrounding casting 100 at the defect area 107, while not disturbing the surface tension forces that hold the molten material 127 in the through-hole 120. Further, the electron beam strength is also balanced to maintain the suspension of the molten material 127 and avoid full penetration of the casting 100.

The heating preferably comprises a gradual heating of the casting 100 and the repair material plug 126. The predetermined conditions also provide a gradual cooling of the molten material 127. The gradual heating and gradual cooling minimizes temperature gradients formed during repair. Thus, the gradual heating and cooling provides for minimized stress generation in the defect area 107. However, the above described balancing with respect to non-full penetration, surface tension and maintaining a suspension of the molten material 127 in the through-hole 120 must be observed. Other predetermined conditions for heating are as described above. Accordingly, a further description is not provided.

The molten material 127 then re-solidifies at step S106. Any excess material above and below the casting 100 at the area where the through-hole 120 was located, including generated stresses, can be removed further in the repair process, in step S107, if needed. Excess material remaining on the repaired casting surface can be removed by, for example, at least one of a machining process and a benching process.

After the molten material at 127 has re-solidified in step S106 and any excess material is removed, as needed in step S107, the repaired casting is inspected at the defect area 107 by an appropriate inspection device. The inspection device determines whether the repair process has successfully repaired the defect area 107. If the inspection determines that the repair process has successfully repaired the defect, the manufacturing process continues.

Figure 19:
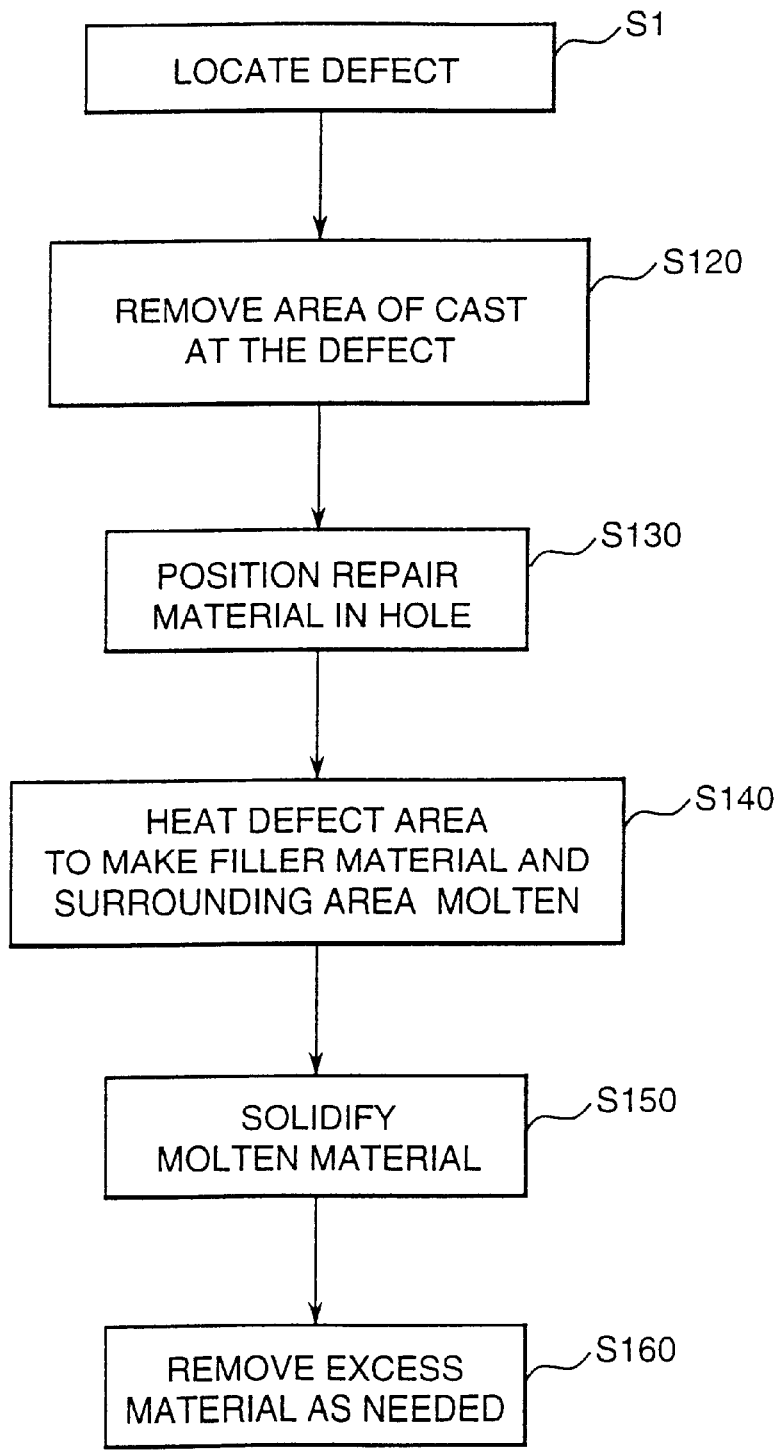
FIG. 19 is a flow chart of a process of FIGS. 15–18, as embodied by the invention.
Figure 20:
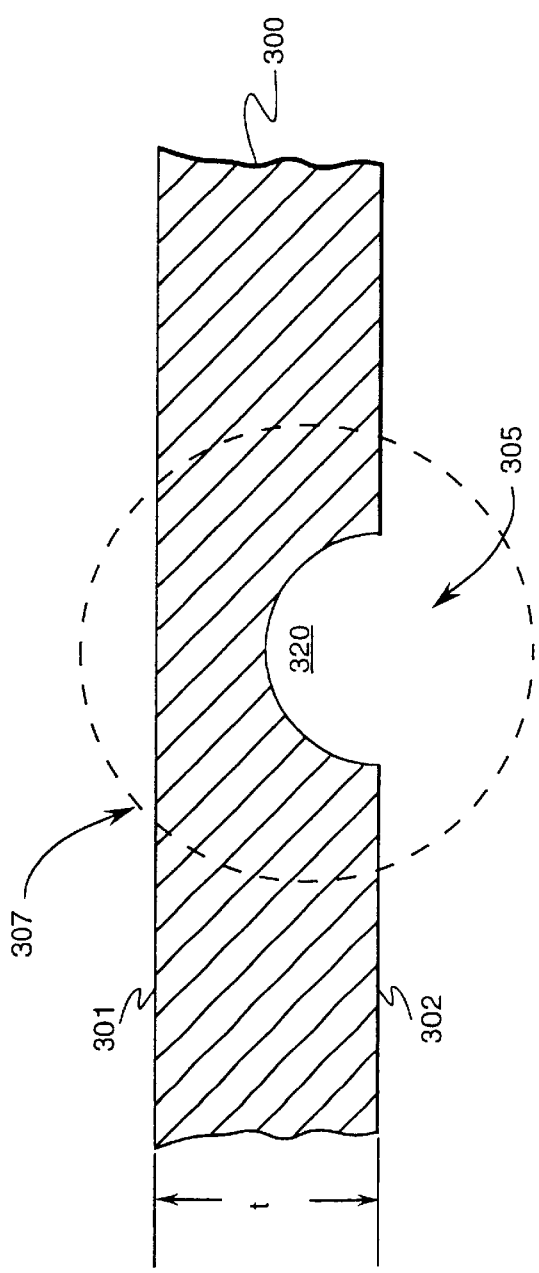
FIG. 20 is a side-sectional view of a defect, for example, a thin region formed by a bumper in a casting.
Figure 21:
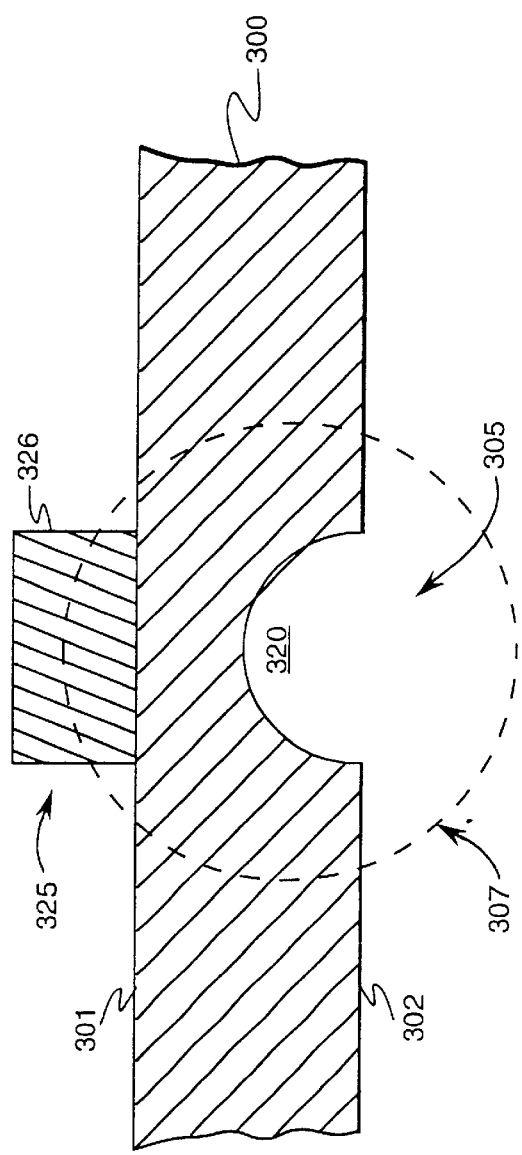
FIG. 21 is a side-sectional view of repair material on the casting, as embodied by the invention.

A further repair process for non-intentional defects, as embodied by the invention, will now be discussed with reference to FIGS. 15–18 and the flowchart of FIG. 19. The non-intentional defects comprises defects such as cracks, both surface and through wall cracks, without bumpers.

The repair process for non-intentional defects comprises defects such as cracks, both surface and through wall cracks, without bumpers comprises first locating the defect 212, such as a through crack as illustrated, in a casting 210 in step S110. Next in step S120, an area of the casting 210 at the defect area 207 is removed to form a hole 220. The hole can be a through-hole extending across the casting 200, or can be a partial hole that extends only partially through the casting 200.

A repair material 225, alternately referred to as a filler material, is then provided in the through-hole 220, in step S130. The repair material 225 is preferably the same material of the casting 200. Alternatively, the repair material 225 may be a material that is compatible, metallurgically and physically, with the casting 200.

The repair material 225 is provided generally in the form of a repair material plug 226. The repair material plug 226 preferably has a general shape approximately conforming to the shape of the through-hole 220. This conforming shape permits the repair material to substantially fill the entire through-hole 220. Alternatively, the repair material plug 226 need not approximate the shape of the through-hole 220. All that is needed is the volume of the repair material plug 226 is greater that the volume of the through-hole 220.

The volume of the repair material plug 226 should be sufficient to completely fill the through-hole 220, and extend above the hole 220 top surface 221 and below the bottom surface 222 of the hole 220. In other words, the volume of the filler material 225 is greater than the volume of the through-hole 220. This extension above the through-hole 220 top surface 221 and the bottom surface 222 of the repair material plug 226 will assure that the repair material plug 226, when melted, will completely fill the through-hole 220.

Once the repair material plug 226 has been inserted into the through-hole 220, the defect area 207 is heated by heat treating in step S140. However, contrary to the full penetration as described above, the heating is not full penetration of the casting thickness t. This non-full penetration heat treating, for example with an electron beam, prevents the electron beam from hitting and disrupting and harming anything located behind the casting 200. The heat in step S140 is applied under predetermined conditions to bring at least a portion of surrounding material of the casting 200 and the repair material plug 226 into a molten condition as molten material 227 in FIG. 18.

With the surrounding material of the casting 200 and the repair material plug 226 heated to molten material 227, the molten material is retained in the through-hole 220 by the surface tension of the molten material interacting with the through-hole 220. The principles of surface tension are well known, and a further discussion of surface tension is omitted.

The surface tension suspends the molten material 227 in the through-hole 220 within the support of the casting 200. The electron beam parameters used for heating in step S140 are optimized to achieve melting of the plug 126 and the surrounding casting 100 at the defect area 207 while maintaining the molten material 227 in the through-hole 220. Further, the electron beam strength is optimized to maintain the suspension of the molten material 227 and avoid full penetration of the casting 200.

The molten material 227 re-solidifies at step S150. Any excess material above and below the casting 200 at the area where the through-hole 220 was located can be removed as part of the repair process, step S160, if needed. Excess material remaining on the repaired casting surface can be removed by, for example, at least one of a machining process and a benching process.

After the molten material at 227 has re-solidified in step S150 and any excess material is removed, as needed, in step S160, the defect area 207 of the repaired casting is inspected by an appropriate inspection device to determines whether the repair process successfully repaired the defect 212. If the inspection determines that the repair process has successfully repaired the defect, the manufacturing process continues.

The heating preferably comprises a gradual heating of the casting 200 and the repair material plug 226. The predetermined conditions also provide for a gradual cooling of the molten material 227. Gradual heating and cooling minimizes temperature gradients formed during repair, thus mediating the residual stresses generated in the defect area 207. Again, the above-described optimization with respect to partial penetration and maintaining a surface-tension governed suspension of the molten material 227 in the through-hole 220 must be observed. Other predetermined conditions for heating are as described above. Accordingly, a further description is not provided.

Figure 24:
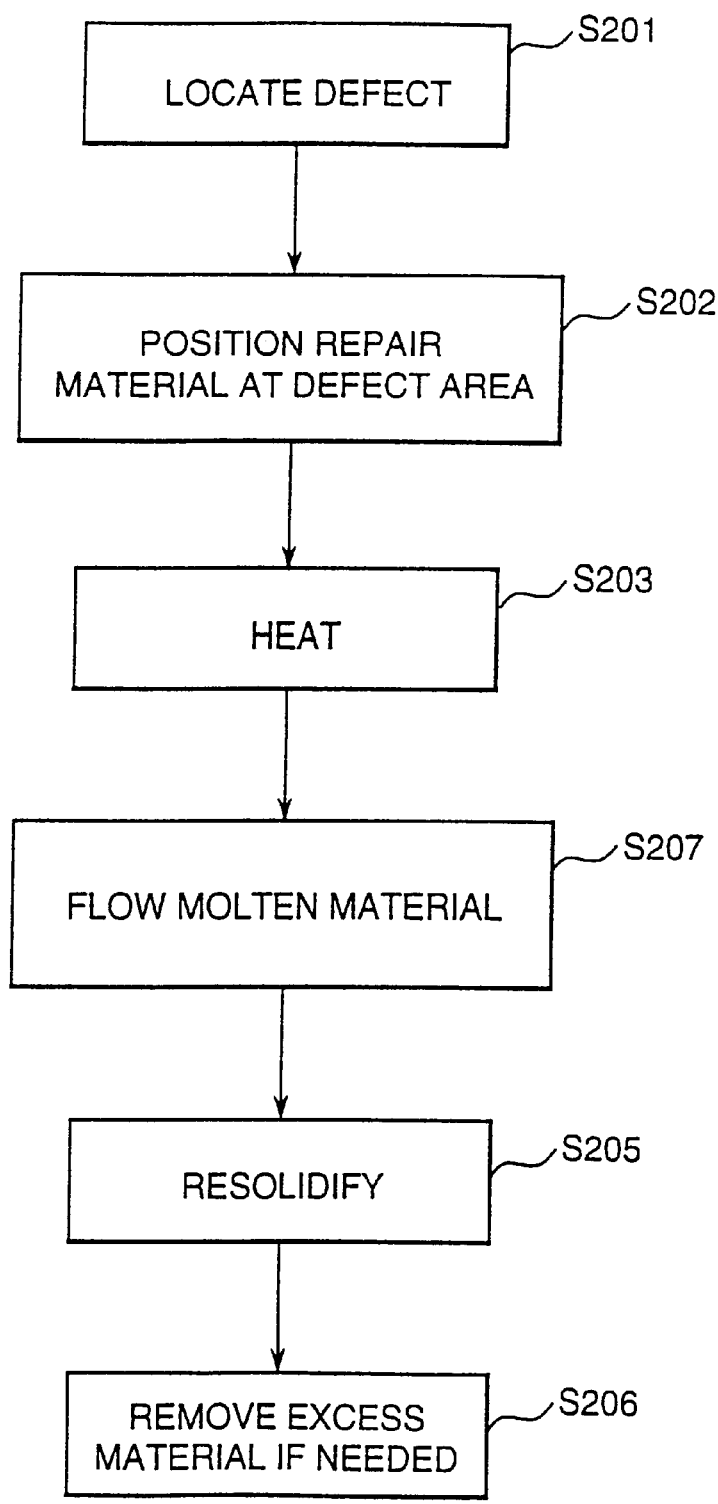
FIG. 24 is a flow chart of a process of FIGS. 20–23, as embodied by the invention.

Another repair method, as embodied by the invention, for the repair of a defect, such as bumper holes in a casting 300 with the casting core removed, will now be discussed with reference to FIGS. 20–23 and the flow chart of FIG. 24. The casting process is, for example but not limited to, an investment casting process. The casting 300 relies upon bumpers for casting due to the complexity of the casting 300. Because investment casting is known in the art, an explanation of the process is omitted.

If the casting process uses bumpers, the repair method for bumper hole defects comprises first locating the defects 305, in step S200. Location of the defects 305 is accomplished after removal, separation, or reduction of the ceramic casting core (not illustrated).

Once the defect 305 has been located, a repair material 325 is positioned at the defect area 307 (dashed line in the Figures) of the cast article 300 that is proximate the bumper hole 320, in step S201. The figures illustrate the repair material 325 on the non-bumper hole surface 301 of the casting 300. However, the scope of the invention comprises the repair material 325 being located on the bumper hole surface 302.

The repair material 325 is preferably the same material as the casting 300. Alternatively, the repair material 325 may be another material that is metallurgically and physically compatible with the casting 300.

The repair material 325 is provided generally in the form of a plug 326. The plug 326 has volume greater that the volume of the bumper hole 320. The volume of the repair material plug 326 should be sufficient to completely fill the bumper hole 320. In other words, the volume of the filler material 325 is greater than the volume of the bumper hole 320. This volume will assure that the repair material plug 326, when melted, will completely fill the bumper hole 320. Any residual stresses that may be formed in the process are believed to be concentrated in the last portion of the molten material to re-solidify, for example in the areas outside of the bumper hole and above the top surface. Thus, any residual stresses that may cause cracks or other such defects can be removed by further machining of the repaired area.

Once the repair material plug 326 has been located at the defect area 307, the area is heat treated, in step S203, with partial penetration of the casting 300, for example with an electron beam. This partial-penetration heat treatment prevents the electron beam from harming anything located behind the casting 300. The heat in step S203 is applied under predetermined conditions to bring at least a portion of surrounding material of the casting 300 and the repair material plug 326 into a molten condition 327, as shown in FIG. 22.

With the surrounding material of the casting 300 and the repair material plug 326 molten 327, the molten material is retained in the casting 300 by the surface tension of the molten material 300. However, the molten material 327 is sufficiently fluid to permit it to flow and conform to the surfaces 301 and 302 of the casting 300, as illustrated in FIGS. 22 and 23. The principles of surface tension are well known, and a further discussion is omitted.

The surface tension suspends the molten material 327 in the casting 300. The electron beam used for heating in step S203 is balanced to achieve melting of the repair material 325 and the surrounding casting 300 at the defect area 307, while not disturbing the molten material 327 suspended in the casting 300. Further, the electron beam strength is also balanced to maintain the suspension of the molten material 327 and avoid full penetration of the casting 300.

The molten material 327, after flowing in step S204, is re-solidified in step S205. The excess material remaining on the repaired casting surface can be removed by, for example, at least one of a machining process and a benching process. The core is then removed, by known methods, to result in the repaired casting.

After the molten material 327 has re-solidified in step S205 and any excess material is removed, as needed in step S206, the repaired casting is inspected at the defect area 307 by an appropriate inspection device to determine whether the repair process has successfully repaired the defect 305. If the inspection determines that the repair process has successfully repaired the defect, the manufacturing process continues.

The heating and predetermined conditions for the heating process, as embodied by the invention, are as discussed above. Therefore, a further discussion of these features of the invention is omitted.

Accordingly, the repair processes, as embodied by the invention, provides an economical, efficient repair of defects, whether intentional or non-intentional, regardless of cause. The repair methods, as embodied by the invention, enable castings to be repaired parts which would otherwise require scrapping of the part. Such repair is desirable from both economical and efficiency considerations.

While the embodiments described herein are preferred, it will be appreciated from the specification that various combinations of elements, variations or improvements therein may be made by those skilled in the art, and are within the scope of the invention.

What is claimed is:

1. A method of repairing a defect in a cast article, the cast article comprising a casting core and a casting, the casting core comprising at least one bumper that creates at least one thin region comprising the defect; the method of repair comprises:

locating a defect at a defect area in the cast article;

removing an area of the casting at the defect area;

removing an area of the casting core including the at least one bumper at the defect area, where the removing the area of the casting at the defect area and the removing an area of the casting core comprising the at least one bumper at the defect area creates a hole;

positioning repair material in the hole;

heating the defect area, the repair material and the area of the casting at the defect area to melt the repair material and area of the casting at the defect area into a molten material; and re-solidifying the molten material to form a repaired casting.

2. A method according to claim 1, further comprising removing excess re-solidified material from the defect area.

3. A method according to claim 1, wherein the casting core comprises a ceramic casting core.

4. A method according to claim 1, wherein the heating comprises heating by electron beam welding.

5. A method according to claim 1, wherein the removal of an area of the casting at the defect area and the removal of an area of the casting core including at least one bumper occur essentially simultaneously.

6. A method according to claim 1, wherein the heating comprises slowly heating the defect area, the repair material and the area of the casting at the defect area to become the molten material, and the heating reduces stresses generated in the molten material and defect area during the re-solidifying.

7. A method according to claim 1, wherein the re-solidifying comprises slowly cooling the molten material, and reducing stresses during the re-solidifying.

8. A method according to claim 1, wherein at least one of the heating and re-solidifying minimizes temperature gradients.

9. A method according to claim 1, wherein heating conditions comprise predetermined conditions, the predetermined conditions comprising at least one predetermined condition selected from the group consisting of:

material composition of the casting; repair material composition; the location of the defect area; ambient environment of the cast article; and combinations thereof.

10. A method according to claim 1, the casting comprises at least one of directionally solidified and single crystal structures, the repair material comprising a material at least having a compatible microstructure with the casting, wherein the method creates a microstructure at the defect area substantially similar to the microstructure of the casting.

11. A method according to claim 1, wherein the repair material comprises a volume at least equal to or greater than the volume of the hole.

12. A method according to claim 1, wherein the repair material comprises a plug, the plug comprising a shape generally conforming to a shape of the hole and comprising a volume at least equal to or greater than the volume of the hole.

13. A method according to claim 1, further comprising inspecting the repaired casting.

14. A method according to claim 13, wherein the inspecting further comprises inspecting the repaired area of the casting using at least one inspection method selected from the group consisting of:

ultrasonic inspection; bright-field inspection; fluorescent die penetrant inspection; x-ray inspection; and combinations thereof.

15. A method of repairing a defect in a cast article, the cast article having a thickness, the method comprising the steps of:

a) locating the defect in the cast article;
b) defining a defect area surrounding the defect;
c) removing a portion of the defect area, wherein removing the defect area comprises removing a portion of the cast article and forming a hole therein;
d) providing a repair material to the defect area;
e) heating the repair material and a portion of the cast article in the defect area to a first temperature above a melting temperature of the cast article and a melting temperature of the repair material, thereby melting both the repair material and the portion of the cast article surrounding the defect area, and
f) cooling the cast article and repair material to a second temperature, the second temperature being less than the melting temperatures of both the cast article and the repair material, such that the repair material and cast article resolidify and fuse together, wherein the defect is repaired.

16. The method of claim 15, wherein the step of removing a portion of the cast article and forming a hole therein further includes forming a through hole in the cast article, the through hole having a shape and a volume.

17. The method of claim 16, wherein the step of providing a repair material to the defect area comprises inserting a repair material plug into the through hole, the repair material plug having a shape substantially conforming to the shape of the through hole.

18. The method of claim 16, wherein the step of providing a repair material to the defect area comprises inserting a repair material plug into the through hole, the repair material plug having a volume that is greater than the volume of the through hole.

19. The method of claim 15, wherein the step of removing a portion of the defect area comprises removing a portion of the cast article surrounding a bumper hole.

20. The method of claim 19, wherein the step of removing a portion of the cast article surrounding a bumper hole further comprises removing a ceramic bumper disposed in said bumper hole.

21. The method of claim 19, wherein the step of removing a portion of the cast article surrounding a bumper hole further includes forming a flat-bottomed hole in the cast article, the flat-bottomed hole having a shape, a volume, and a base, the base being formed by a ceramic casting core.

22. The method of claim 21, wherein the step of providing a repair material comprises inserting a repair material plug into the flat-bottomed hole, the repair material plug having a shape substantially conforming to the shape of the flat-bottomed hole.

23. The method of claim 21, wherein the step of providing a repair material comprises inserting a repair material plug into the flat-bottomed hole, the repair material plug having a volume that is greater than the volume of the flat-bottomed hole.

24. The method of claim 21, wherein the step of heating the repair material and a portion of the cast article surrounding the defect area to a first temperature above a melting temperature of the cast article and a melting temperature of the repair material comprises heating the repair material plug and the portion of the cast article surrounding the defect area through the thickness of the cast article, melting the repair plug and the portion of the cast article surrounding the defect area, and supporting the molten repair material plug and cast article with the ceramic casting core.

25. The method of claim 20, wherein the step of removing a portion of the cast article surrounding a bumper hole and a ceramic bumper further comprises removing a ceramic core supporting the cast article, thereby forming a through hole in the cast article, the through hole having a shape and a volume.

26. The method of claim 25, wherein the step of providing a repair material to the defect area comprises inserting a repair material plug into the through hole, the repair material plug having a shape substantially conforming to the shape of the through hole.

27. The method of claim 25, wherein the step of providing a repair material to the defect area comprises inserting a repair material plug into the through hole, the repair material plug having a volume that is greater than the volume of the through hole.

28. The method of claim 15, wherein the step of locating the defect in the cast article comprises locating at least one surface defect selected from the group consisting of a crack, a void, a freckle, and an inclusion.

29. The method of claim 28, wherein the step of providing a repair material to the defect area comprises providing a wire formed from a repair material to the defect area, the wire having a volume that is greater than a volume of the surface defect.

30. The method of claim 28, wherein the step of providing a repair material to the defect area comprises providing a repair material to the defect area, the repair material having a shape that conforms to a shape of the surface defect and a volume that is greater than the volume of the surface defect.

31. The method of claim 15, further comprising the step of removing an excess amount of the repair material that is present on a surface of the cast article after the repair material and cast article have resolidified and fused together.

32. The method of claim 15, further comprising the step of inspecting the defect area of the cast article for a defect after the repair material and cast article have resolidified and fused together.

33. The method of claim 15, wherein the step of providing a repair material to the defect area comprises providing a repair material having a composition that is the same as a composition of the cast article.

34. The method of claim 15, wherein the step of providing a repair material to the defect area comprises providing a repair material that is physically and metallurgically compatible with the cast article.

* * * * *